March 13, 1962 L. G. ALLEN 3,024,981

THREE IMAGE BUFFER SYSTEM FOR CARD READER

Filed Dec. 15, 1958 2 Sheets-Sheet 1

INVENTOR

Lowell G. Allen

BY Sughrue & Rothwell

ATTORNEYS

March 13, 1962 L. G. ALLEN 3,024,981

THREE IMAGE BUFFER SYSTEM FOR CARD READER

Filed Dec. 15, 1958 2 Sheets-Sheet 2

INVENTOR

Lowell G. Allen

BY Sughrue & Rothwell

ATTORNEYS

United States Patent Office 3,024,981

Patented Mar. 13, 1962

3,024,981

THREE IMAGE BUFFER SYSTEM FOR CARD READER

Lowell G. Allen, Hopewell Junction, N.Y., assignor to International Business Machines Corporation, New York, N.Y., a corporation of New York Filed Dec. 15, 1958, Ser. No. 780,555
7 Claims. (Cl. 235—61.7)

This invention relates to a record reading system and more particularly to a system designed to compare information read from a record card at a first read station with information read therefrom at a second read station and to compare the read-outs from these two stations and to indicate the lack of comparisons between the two read-outs.

It is often necessary to provide checking means to check read-out information or data from a record means such as a punched card and the like and to permit said data to enter the further routines of the system only if the check is valid. In a specific embodiment of this invention, an IBM record card having twelve rows and eighty columns of significant areas upon which data can be recorded in the form of punched holes is read out at a first read station and at a second read station. Means are provided to store row-by-row in a first storage means such as a core matrix the information read out at the first read station. Means are also provided for similarly storing the data read out at the second read station in a second core matrix. With the information from the card now stored in the first and second core matrices, both of said matrices are read out column-by-column and a comparison is made bit-by-bit. Any difference between two corresponding bits constitutes an error. This permits isolation of errors to column and rows of storage. It permits early detection of errors and makes error corection easier. It eliminates the possibility of missing errors due to dropping out or picking up an even number of bits in the same row as might be the case in the horizontal redundancy check method.

Particularly this invention provides a system in which data is represented by indicia on a first record. Data on a first record is read out at a first read station into a first storage means such as a core matrix. Data on a second record is next read out at the first read station into a second storage means such as another core matrix. At this time the first record has been moved to a second read station where it is read out and stored in a third storage means such as a core matrix. It can be seen at this part of the cycle that the first record is stored in the first and third core matrices and the second record is stored in the second core matrix. The first and third core matrices are read out in column-by-column fashion to a comparison unit where the data bits are compared bit by bit and an error signal is provided whenever a lack of comparison between associated bits occur.

Next the second record is read out at the second read station and stored in the third core matrix and a third record is read out and stored in the first core matrix. Now the second and third core matrices are read out for comparison. The cycles as above are then repeated for succeeding cards. The capacity for this system is about 1,000 cards per minute.

Figure 1:
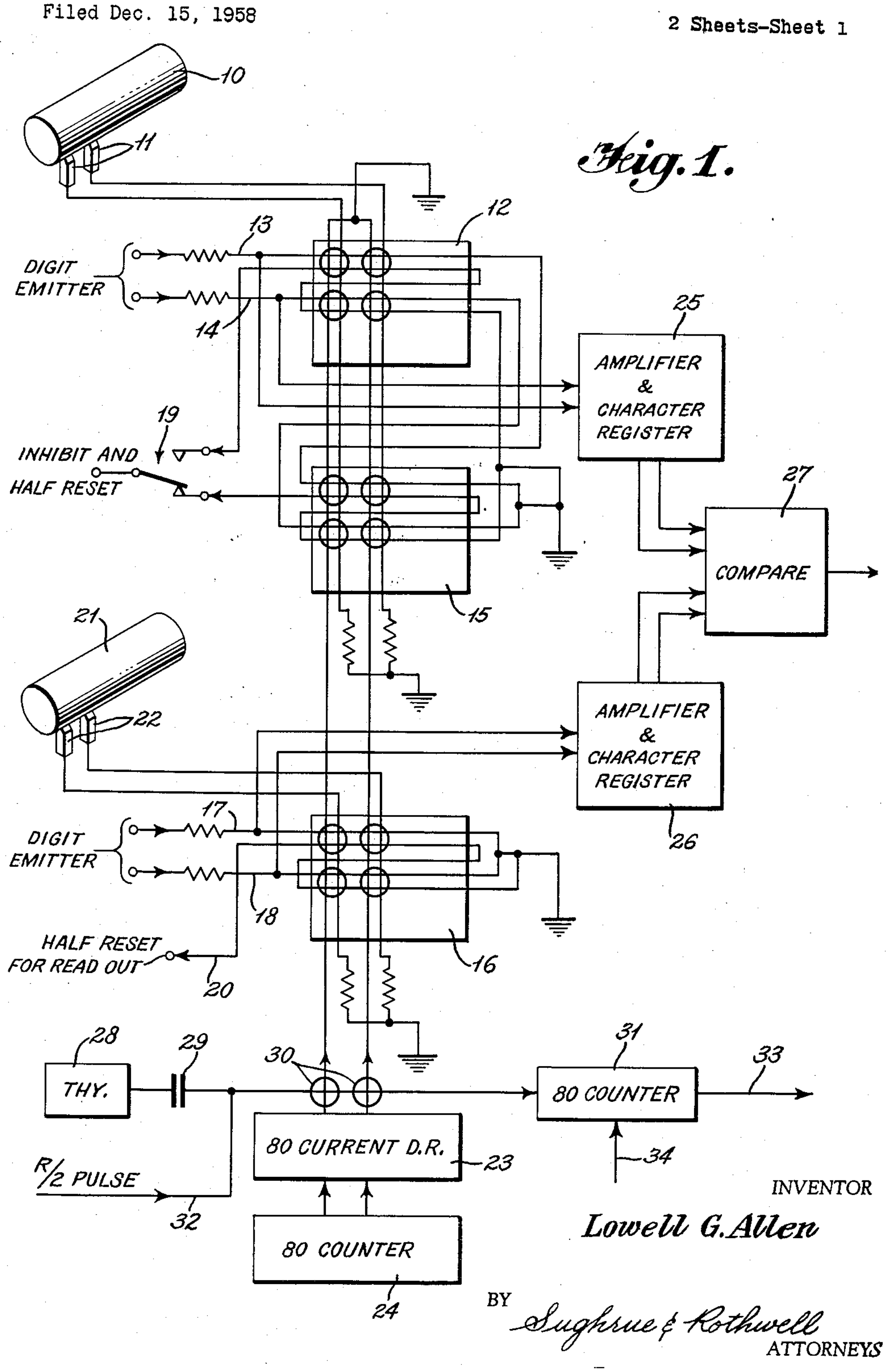
FIGURE 1 is a view showing a diagrammatic representation of the card reader and comparison system constructed in accordance with this invention.

Referring first to FIGURE 1, the numeral 10 identifies a drum upon which a card is positioned for reading purposes. For the purpose of illustration, let it be assumed that the record is a standard IBM card having twelve columns and eighty rows. The reading from the read station is accomplished in a row-by-row fashion. There are a plurality of brushes 11, eighty in number, which read the punched card and provide read-in to the three matrices 12, 15 and 16. The three matrices are comprised of a 12 x 80 array of two state cores each having a set and a reset state. Normally all of the cores are in a reset condition. To set a core requires the application to the core of a read-in current pulse of W amplitude. The read-in from the brushes applies W/2 current to the cores. A digit emitter (not shown) applies W/2 pulse to line 13 when the first column of the card is being read and to line 14 when the second column of the card is being read, etc. synchronized with the read-in from brushes 11. It can be seen that the digit emitter for matrix 12 also supplies the W/2 pulse for matrix 15. The digit emitter for matrix 16 applies the W/2 pulses on lines 17, 18, etc. Switch 19 is normally in the position as shown in this figure with the switch contact in the lower position. To this switch is applied an inhibit pulse or a reset pulse of R/2 amplitude where R is the amplitude of current necessary to reset a core. The inhibit pulse is of sufficient amplitude to prevent the change of state of any core to which it is applied. It can be seen that the inhibit or R/2 pulse may be applied selectively to the cores in matrix 12 or 15 depending upon the position of switch 19. From a suitable source (not shown), an R/2 pulse is applied on line 20 to all of the cores in matrix 16.

At the second reading station is a similar setup. It includes a drum 21 upon which a card is positioned for reading and a plurality of reading brushes 22.

With data bits stored in the matrices 12, 15 and 16, read-out is obtained by the application of an R/2 pulse on line 20 to matrix 16 and through switch 19 to either matrix 12 or matrix 15 in conjunction with an R/2 pulse supplied by the 80-current drivers 23. The drivers are of a conventional type and supply R/2 pulses sequentially to each of the eighty columns in the three matrices. The particular column supplied is determined by the ring counter 24 which may be of a conventional trigger type.

When any two selected matrices are read out for comparison purposes, the bits are fed to the amplifier and character registers 25 and 26. Upon the coincidence of two R/2 current pulses in a set core, the core is reset and the switching thereof is sensed on the sense winding associated with the core which in this particular case is the same winding to which the digit emitter pulse is applied. These provide read-out pulses from the switched cores which pulses are fed to the registers 25 and 26 in bit-by-bit fashion as the columns are sequentially read out. The registers 25 and 26 function to register the bits supplied thereto from the matrices and feed the bits in bit-by-bit fashion to the comparator 277. There, bit-by-bit comparison is made of associated bits and the output from the comparitor 27 indicates any lack of comparison. The units 25, 26 and 27 may be of any conventional variety.

The thyratron 28 through the condenser 29 applies a W pulse to all of the cores in a one-by-eighty matrix identified by numeral 30 to set all of these cores. When the ring counter 24 has run out to read out the data stored in the selected matrices, the eighty counter 31 should have counted eighty counts. Each time one of the eighty current drivers supplies an R/2 pulse to one of the columns in the matrices, an R/2 pulse is also applied on line 32 to all of the cores in the one-by-eighty matrix 30. So it can be seen that for a proper operation of the driver 23 each time a driver supplies an R/2 pulse to a column of cores in the selected matrices this R/2 pulse in cooperation with the R/2 pulse on line 32 to the one-by-eighty matrix should switch that particular core and add a count in the counter 31. If at the end of a cycle there are less than eighty counts, the output of counter 31 will so indicate by a signal at its output on line 33. The counter is interrogated by a signal applied to it on line 34.

Let it now be assumed that card 1 is in the first read station. During the first read cycle, matrix 15 will be inhibited by the application of an inhibit pulse through switch 19 with the switch 19 in its down position as shown. The read brushes 11 read the first row of card 1 into matrix 1. At this time, the digit emitter applies a W/2 pulse to line 13. As a result, the first row of card 1 is read out and stored in the first row of matrix 12. The drum then moves the card so that the second row is read out and stored in the second row of matrix 12, the digit emitter now supplying a W/2 pulse to line 14. The twelve rows of card 1 are by this process stored in matrix 12. All of this time, matrix 15 is inhibited. During the second read cycle, card 1 is moved to the second read station and positioned on the drum 21. Simultaneously, card 2 is moved into reading position in the first read station. The first card is by a similar process read into matrix 16. The switch 19 moves to its upper position and matrix 12 is inhibited. Card 2 is read and stored in matrix 15. At this time, card 1 is stored in matrices 12 and 16 and card 2 in matrix 15. Then, read-out of matrices 12 and 16 occurs. With switch 19 in the upper position, an R/2 pulse is applied to all of the cores in matrix 12. The counter 24 commences its cyclic operation and causes the first current driver in unit 23 to apply an R/2 pulse to row 1 of matrices 12 and 16. An R/2 pulse is applied through switch 19 to all of the cores in matrix 12 and on line 20 to all of the cores in core 16. As a result, the cores in column 1 of matrix 12 and the cores of column 1 in matrix 16 are read out to the registers 25 and 26, respectively. It can be seen then that read-out from the selected matrices is accomplished column by column to provide parallel read-out on each of the sense lines associated with the respective columns and thereby providing parallel input to the registers 25 and 26. There the bits are stored column-by-column in the register and read-out column-by-column from each of the registers to the comparator 27 for individual bit-by-bit comparison.

After read-out of matrices 12 and 16, card 2 is still stored in matrix 15. Card 3 is now positioned in the first read station and is read out therefrom and stored in matrix 12. The second card which is now at the second read station is read out therefrom and stored in matrix 16. Matrix 15 is inhibited at this time. Then matrices 15 and 16 are read out to the registers 25 and 26 and from there are compared in the comparator 27 bit by bit.

In the next cycle of operation, matrix 12 is inhibited and card 3 is read into matrix 16 and card 4 into matrix 15. Next matrix 12 is read out simultaneously with matrix 16 to provide a bit-by-bit comparison in comparator 27.

Figure 2:
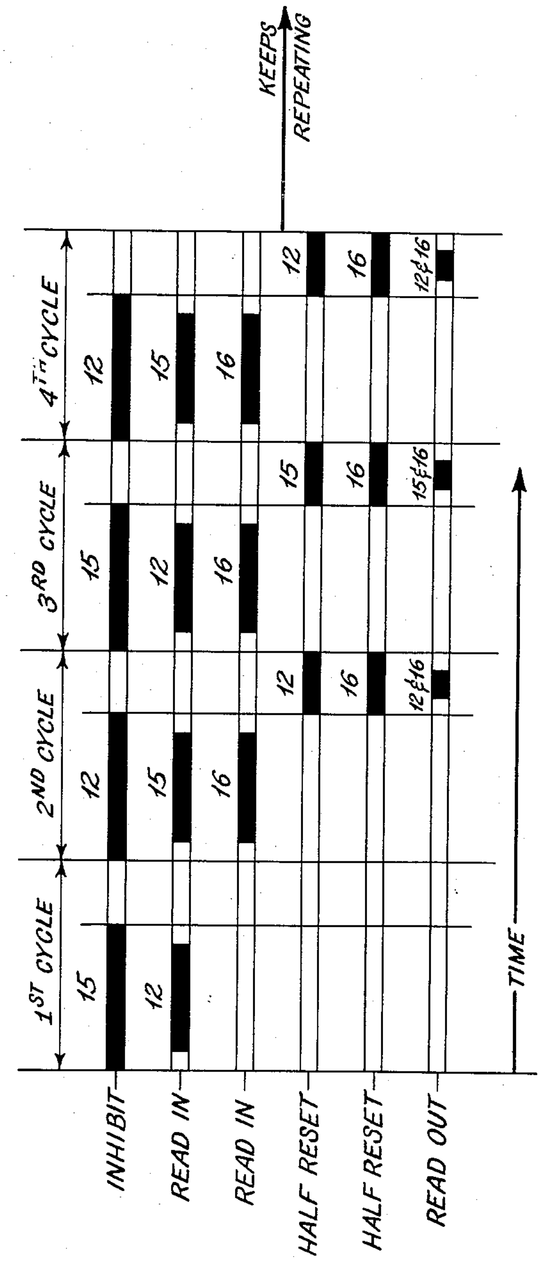
FIGURE 2 is a timing chart showing the time relationships during each succeeding cycle of the various inhibit, read in, etc. phases.

Referring to FIGURE 2, the four cycles of operation above described are shown and the time sequence of operation is evident from this chart. The numbers 12, 15 and 16 refer to the respective matrices of FIGURE 1.

By providing means to connect the brushes in the read stations to the matrices through a plug board, allowance thereby is made if desired for complete rearrangement of the data in the record cards.

What has been described is one embodiment of the present invention. Other embodiments obvious to those skilled in the art are contemplated to be within the spirit and scope of the accompanying claims.

What is claimed is:

1. A device for comparing record data comprising first, second and third record storage means, first and second record sensing means, means first to store first data sensed by said first record sensing means in said first record storage means, means to second store first data sensed by said second record sensing means in said third record storage means, means simultaneously with said last-mentioned means to store second data sensed by said first record sensing means in said second record storage means, and means to compare the stored data in said first and third record storage means.

2. A device for comparing record data comprising first, second and third record storage means, first and second record sensing means, means to store during a first time cycle data sensed by said first record sensing means in one of said first and second record storage means, means to store during a second time cycle data sensed by said second record sensing means in said third record storage means, means to store during said second time cycle data sensed by said first record sensing means in said other of said first and second record storage means, and means to compare the data stored in said third record storage means and the data stored in said one record storage means.

3. A device for comparing record data comprising first, second and third record storage means, first and second record sensing means, means to store during a first time cycle data sensed by said first record sensing means in one of said first and second record storage means, means to store during a second time cycle data sensed by said second record sensing means in said third record storage means, means to store during said second time cycle data sensed by said first record sensing means in said other of said first and second record storage means, means to read out stored data from said third record storage means and from said one record storage means, means to compare said read-out data, means subsequent to said read-out to store data sensed by said first record sensing means in said one of said first and second record storage means, means simultaneously with said last-mentioned means to store data sensed by said second record sensing means in said third record storage means and means to compare the stored data in said other and said third record storage means.

4. A device for comparing data represented by indicia on a record comprising first, second and third matrices, each comprising a plurality of storage elements capable of assuming alternate stable states, each matrix including at least one element for each unit of indica, first and second sensing means for successively reading said records, read-in winding means associated with each storage element in said first and second matrices coupled to said first sensing means and adapted to be energized thereby, each element assuming one of said stable states in accordance with said indicia, inhibit means alternately operable between said first and second matrices, read-in winding means associated with each storage element in said third matrix coupled to said second sensing means and adapted to be energized thereby, each element assuming one of said stable states in accordance with said indicia, comparing means, first read-out means associated with said third matrix and coupled to said comparing device for entry of said records therein, and second read-out means associated with said first and second matrices and coupled to said comparing device adapted to enter like records therein corresponding to the record entered from said third matrix.

5. A device as claimed by claim 4 wherein said storage elements are two-state magnetic cores.

6. A device as claimed by claim 5 wherein said inhibit means comprises inhibit winding means associated with each of said cores in said first and second matrices and means to alternately apply an inhibiting signal to said first and second matrices.

7. A device as claimed in claim 6 wherein said first readout means comprises first read-out winding means associated with each of said cores in said third matrix, means to apply a half reset signal to said third matrix cores, second read-out winding means associated with said first, second and third matrices cores and means to apply a coincident half reset signal to said first, second and third matrices cores and said second readout means comprises said inhibit winding means, means to alternately apply a half reset signal to said first and second matrices cores, said second readout winding means and said means to apply said coincident half reset signal.

No references cited.